United States Patent [19]
Payne

[11] 3,931,878
[45] Jan. 13, 1976

[54] SANITARY ROLLER CONVEYOR

[75] Inventor: Ralph Payne, Irving, Tex.

[73] Assignee: FEI, Inc., Dallas, Tex.

[22] Filed: Apr. 4, 1974

[21] Appl. No.: 457,859

Related U.S. Application Data

[63] Continuation of Ser. No. 334,469, Feb. 21, 1973, abandoned.

[52] U.S. Cl. .................................. 193/37; 308/20
[51] Int. Cl.² ........................................ B65G 39/09
[58] Field of Search ........ 193/37, 35 R; 308/20, 72, 308/194, 18, 190, 233; 29/110, 116 R, 116 AD; 198/127, 192 R, 192 A

[56] References Cited
UNITED STATES PATENTS

| | | | |
|---|---|---|---|
| 1,141,515 | 6/1915 | Alvey | 193/37 |
| 1,219,901 | 3/1917 | Alvey | 193/37 |
| 2,031,618 | 2/1936 | Robins | 308/194 |
| 2,345,564 | 4/1944 | Allen | 308/72 |
| 3,258,097 | 6/1966 | Wahl | 193/37 |
| 3,353,644 | 11/1967 | McNash et al. | 193/37 |

FOREIGN PATENTS OR APPLICATIONS

| | | | |
|---|---|---|---|
| 985,792 | 3/1965 | United Kingdom | 193/37 |
| 699,295 | 11/1953 | United Kingdom | 193/37 |
| 241,052 | 10/1962 | Australia | 308/20 |

Primary Examiner—Evon C. Blunk
Assistant Examiner—James L. Rowland
Attorney, Agent, or Firm—Richards, Harris & Medlock

[57] ABSTRACT

The specification discloses a roller conveyor having a plurality of elongated cylinders arranged to define a planar conveyor path. Each of the cylinders includes a low friction plastic bearing member rigidly mounted in the end thereof, with each of the bearing members including blind sockets formed in the centers. The cylinders are disposed between a pair of parallel side rails and a plurality of rigid metal shafts are connected along the interior sides of the rails. The ends of the shafts are received within the blind sockets in the bearing members such that the bearing members and cylinders rotate relative to the rigid metal shafts.

6 Claims, 4 Drawing Figures

SANITARY ROLLER CONVEYOR

This is a continuation of application Ser. No. 334,469, filed Feb. 21, 1973, now abandoned.

FIELD OF THE INVENTION

This invention relates to roller conveyors and more particularly to roller conveyors having bearings which may be operated and cleaned without accumulating undesired foreign substances within the conveyor rollers.

THE PRIOR ART

Previously developed roller conveyors generally include cylindrical rollers having bearings in the ends thereof, with an axle passing through the bearings and the roller for connection to side rails. The bearings generally comprise ball bearings or plastic inserts. When such prior roller conveyors are utilized in plants which require sanitary conditions, such as for example, food plants, pharmaceuticals and munitions manufacturers, and the like, problems have arisen when it is necessary to clean such roller conveyors. High pressure water and/or steam with detergents or other agents are generally utilized to clean the rollers. Due to the fact that the axle passes through the bearings of such prior roller conveyors, some of the liquid and cleaning material, as well as some of the undesirable foreign substances on the roller, is forced through the bearing into the cavity inside the roller. An accumulation of these materials often tends to build up inside the roller and breeds bacteria, odors, and other undesirable conditions, not the least of which includes rusting of the ball bearings or grinding away of non-ferrous bearings. Moreover, it has often been somewhat difficult to remove the rollers of previously developed roller conveyors.

SUMMARY OF THE INVENTION

In accordance with the present invention, a roller conveyor is provided which generally eliminates or reduces the problems which characterizes the prior art. The present roller conveyor may be cleaned in place by the application of a high pressure stream of fluid solution, without the attendant possibilities of forcing some of the cleaning solution and/or foreign substances within the roller cavity. The present roller conveyor does not tend to rust or fail due to an accumulation of foreign matter within the roller as a result of cleaning of the conveyor.

In accordance with another aspect of the invention, a roller conveyor includes an elongated opened ended cylinder. Cylindrical bearings are frictionally mounted in the ends of the cylinder. A blind socket is formed in the center of each of the bearings. Rigid shafts having circular ends are fitted within the blind sockets such that the bearings and cylinder may rotate relative to the shaft.

In accordance with a more specific aspect of the invention, a roller conveyor system includes a pair of spaced apart parallel rails. A plurality of metal shafts are connected at spaced apart locations along the interior sides of the rails. Cylindrical metal rollers are disposed between the rails. Low friction plastic bearing members are rigidly mounted in the ends of the rollers, with blind sockets being formed in the center of the bearing members. The ends of the shafts are received within the blind sockets to rotatably suspend the metal rollers between the rails.

DESCRIPTION OF THE DRAWINGS

For a more complete understanding of the present invention, and for further objects and advantages thereof, reference is now made to the following description taken in conjunction with the accompanying drawings, in which.

DESCRIPTION OF THE PREFERRED EMBODIMENT

Figure 1:
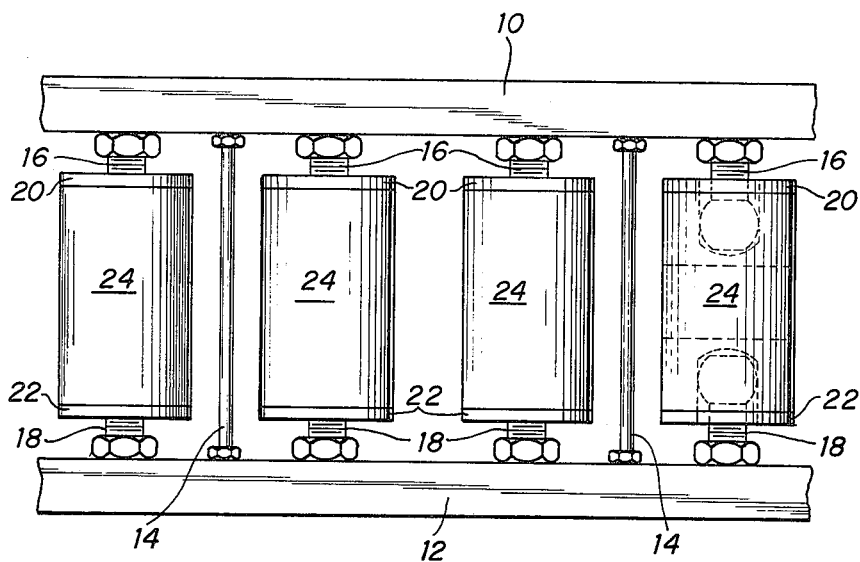
FIG. 1 is a top view of a portion of a roller conveyor constructed in accordance with the present invention.

Referring to FIG. 1, a pair of side rails 10 and 12 are spaced apart and are interconnected in a rigid configuration by stabilizing rods 14. Rails 10 and 12 and other metal parts of the conveyor system are preferably made from stainless steel, although a variety of other metals or plastics could be utilized. A plurality of pairs of rigid shafts 16 and 18 extend from the side rails 10 and 12. The ends of the shafts 16 and 18 are rounded and are received within blind sockets formed in the ends of plastic bearing members 20 and 22, in a manner which will be subsequently described. The bearing members 20 and 22 are force fitted into the open ends of cylindrical rollers 24. Rollers 24 may be constructed from metal such as stainless steel, or alternatively from other materials such as PVC, CPVC, polypropylene or other plastics.

Figure 2:
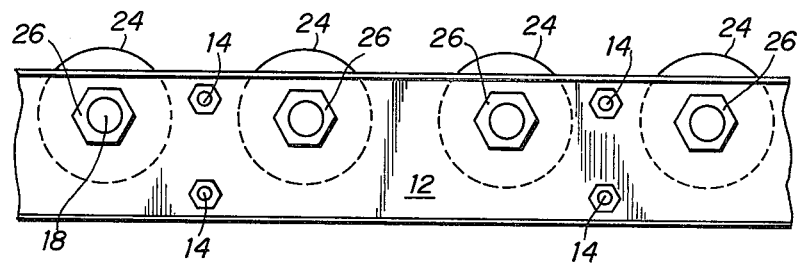
FIG. 2 is a side elevational view of the roller conveyor system shown in FIG. 1.

FIG. 2 illustrates a side view of the roller conveyor system shown in FIG. 1. The ends of the shafts 18 are attached to the side rail 12 by nuts 26. The shafts 18 are positioned in the upper portion of the side rail 12 such that the tops of the rollers 24 project above the side rail 12. Boxes and other apparatus may thus be rolled over the tops of the rollers 24 in the manner of a typical roller conveyor system.

An important aspect of the present invention is the fact that the rigid shafts 16 and 18 do not extend through the bearing members 20 and 22, thereby eliminating the possibility of fluid or foreign material from collecting inside the rollers 24. The present system may thus be washed with high pressure fluid without the fear of accumulating foreign material within the rollers.

Figure 3:
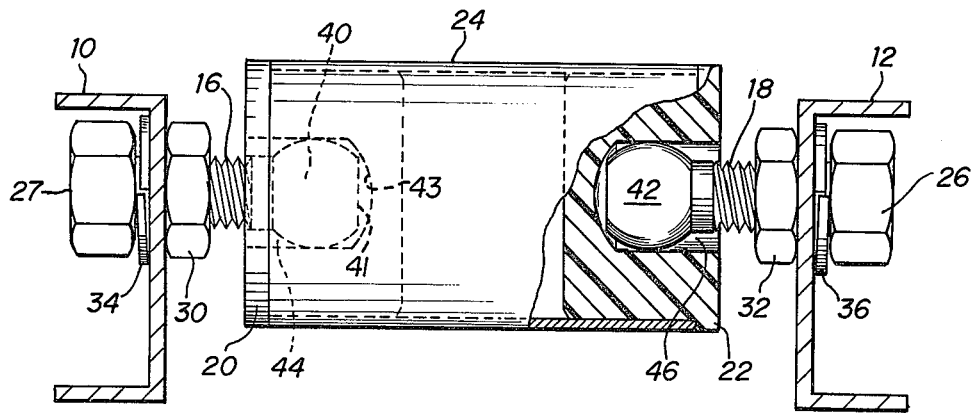
FIG. 3 is a side view partially broken away, of one of the conveyor rollers shown in FIG. 1; and, FIG. 4 is a perspective view of one of the bearing members of the invention.

FIG. 3 illustrates in detail the preferred construction of one of the rollers 24. The side rails 10 and 12 have generally U-shaped cross-sections, with apertures spaced along the length thereof for receiving the ends of shafts 16 and 18. As is shown in FIG. 3, the length of the shafts 16 and 18 are threaded. The threaded ends of the shafts are disposed through apertures in the rails 10 and 12 are secured to the rails by interior nuts 30 and 32 and by exterior nuts 27 and 26. Lock washers 34 and 36 are disposed between the nuts 26 and 27 and the side rails. This connection of the shafts 16 and 18 in the side rails enables the shafts to be easily removed for cleaning or for roller replacement.

The ends of the shafts 16 and 18 comprise circular ball members 40 and 42 which, preferably, have flat, truncated end surfaces 41. The ball member 40 extends within a blind socket 44 defined within the plastic bearing member 20. The ball member 42 extends within a blind socket 46 formed within the plastic bearing member 22. The blind sockets are preferably right circular cylindrical and preferably include end surfaces 43 which extend concavely from within and which, with the end surfaces of the ball members, define spaces therebetween even in the event that the roller assembly is so adjusted that surfaces 41 and 43 are in mutual engagement. Bearing members 20 and 22 are preferably machined of self-lubricating plastic having a low coefficient of friction. A material suitable for use in forming the bearing members is a plastic manufactured and sold under the trademark "1900 UHMW" by Hercules Chemical, Inc. of Wilmington, Del. Such high impact plastics have an extremely low coefficient of friction with high hardness index. The plastics are highly resistant to most chemicals and have extremely high abrasion resistance. Of course, it should be realized that any one of a number of plastics within the plastic family called polyolefin which have the desired lubricity, impact and abrasive resistance qualities may be utilized with the present invention to form the bearing members.

Figure 4:
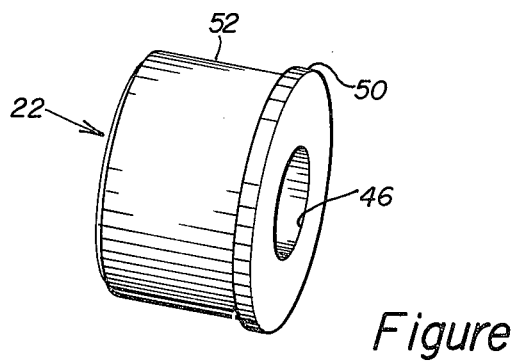

A perspective view of the bearing member 22 is illustrated in FIG. 4 whereupon it will be seen that the bearing member includes an outer annular flange 50 which abuts with the end of the roller 24. The rear body of the bearing member 22 includes a cylindrical member dimensioned to fit tightly within the interior diameter of the roller 24. Thus, it is not possible for fluid or other material to be forced between the periphery of the bearing member 22 and the interior diameter of the roller 24. The blind socket 46 is dimensioned to closely receive the ball member 42. Due to the fact that the blind socket 46 does not extend through the bearing member 22, no path is provided for liquid or debris to pass through the bearing member 22 to the interior of the roller 24.

It will thus be seen that the sanitary roller conveyor of the invention eliminates any possibility of entrance of any foreign matter within the rollers. The sidethrust provided to the bearing members may be controlled by moving the shafts in and out by adjusting the nuts on the threaded end of the shafts. Adequate support for the side rails and stability and alignment are accomplished with the utilization of the stabilizing rods 14. The present sanitary roller may be cleaned and placed on a food line or the like with a high pressure hose used to apply pressuried cleaning solutions to the ends of the rollers. The pressurized cleaning solution will pass around the end of the shafts within the blind sockets to wash out anything collected therein during operation of the rollers, but the solution will not pass to the interior of the rollers. The rollers may be installed and removed by the simple expedient of loosening the nuts and screwing the ball ends of the shafts toward the rails. Alternatively, all of the rollers may be completely removed by removing the exterior nuts on one end of the stabilizing rods and separating the side rails. Because the entire roller conveyor may be constructed from either stainless steel or plastic material, no rusting or other deterioration of the roller conveyor would be incurred during normal usage of the system.

Although a preferred embodiment of the invention has been described in detail, it is to be understood that various changes, substitutions, and alterations can be made therein without departing from the spirit and scope of the invention as defined by the appended claims.

What is claimed is:

1. A roller conveyor system comprising:
   a pair of spaced apart rails,
   a plurality of opposed metal stub shafts connected at spaced apart locations along the interior sides of said rails,
   hollow cylindrical rollers disposed between said rails,
   low friction plastic bearing members rigidly mounted in the ends of said hollow rollers,
   said bearing further comprising means for preventing foreign liquid and solid substances from entering the hollow cylindrical rollers,
   blind right circular cylindrical sockets formed in the center of the outer ends of each of said low friction plastic bearing members, and spaced a predetermined distance apart,
   the blind sockets of each roller having inner end surfaces extending concavely from within, and
   generally spherical bearing portions integrally formed on the ends of said stub shafts for being received within said blind sockets, said bearing portions being dimensioned to bear directly against the interior plastic walls of said blind sockets of the low friction plastic bearing members to rotatably suspend said bearing members and the hollow rollers carried thereby between said rails while preventing the accumulation of debris within said blind sockets,
   said bearing portions having truncated inner end surfaces positioned more than the predetermined distance apart so that the end surface of each of the bearing portions and the end surface of its respective blind socket to define a space therebetween.

2. The roller conveyor system of claim 1 and further comprising:
   threads on the ends of said stub shafts opposite said bearing portion for attaching said shafts to the interior sides of said rails.

3. The roller conveyor system of claim 2 and further comprising:
   nuts for removably connecting said threaded ends of said shafts to said rails.

4. The roller conveyor system of claim 1 wherein said bearing members are frictionally seated within the ends of said hollow rollers, and said bearing members include integrally formed annular flanges for abutting with the end of said roller and thereby regulating the seating depth within said rollers and preventing foreign liquid and solid substances from entering said hollow rollers.

5. The roller conveyor system of claim 1 and further comprising stabilizing braces rigidly interconnecting said rails.

6. The roller conveyor system of claim 1 wherein said stub shafts include means for adjusting the distance said shafts extend from the interior sides of said rails.

* * * * *

UNITED STATES PATENT OFFICE
CERTIFICATE OF CORRECTION

Patent No. 3,931,878   Dated January 13, 1976

Inventor(s) Ralph Payne

It is certified that error appears in the above-identified patent and that said Letters Patent are hereby corrected as shown below:

Col. 4, line 16, "bearing further" should be --bearing members further--.

Signed and Sealed this

Seventh Day of September 1976

[SEAL]

Attest:

RUTH C. MASON
Attesting Officer

C. MARSHALL DANN
Commissioner of Patents and Trademarks